(12) United States Patent
Stephan

(10) Patent No.: US 6,695,415 B2
(45) Date of Patent: Feb. 24, 2004

(54) BRAKE FLUID PRESSURE RELIEF ASSEMBLY

(75) Inventor: Craig Hammann Stephan, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 112 days.

(21) Appl. No.: 10/114,744

(22) Filed: Apr. 4, 2002

(65) Prior Publication Data
US 2003/0188778 A1 Oct. 9, 2003

(51) Int. Cl.⁷ .............. F16K 17/36; B60T 8/32
(52) U.S. Cl. .......... 303/9.68; 303/24.1; 303/68; 303/71; 137/45
(58) Field of Search .............. 137/45; 303/24.1, 303/9.67, 68, 69, 71, 9.68

(56) References Cited

U.S. PATENT DOCUMENTS

| | | |
|---|---|---|
| 3,529,872 A | 9/1970 | Mitton |
| 3,582,153 A | 6/1971 | Pitcher |
| 3,982,794 A * | 9/1976 | Colovas et al. ............ 303/9.68 |
| 4,070,067 A * | 1/1978 | Katoh et al. ............... 303/9.68 |
| 4,077,673 A * | 3/1978 | Takeshita et al. .......... 303/9.68 |
| 4,080,006 A | 3/1978 | Nogami et al. |
| 4,141,596 A | 2/1979 | Takeshita et al. |
| 4,179,164 A | 12/1979 | Konishi et al. |
| 4,245,867 A | 1/1981 | Kondo et al. |
| 4,502,735 A | 3/1985 | Kubota |
| 4,652,058 A | 3/1987 | Runkle et al. |
| 4,745,995 A * | 5/1988 | Wupper .............. 303/24.1 |
| 5,388,606 A | 2/1995 | Banks |
| 6,565,160 B1 * | 5/2003 | Ewing et al. .............. 303/1 |

* cited by examiner

Primary Examiner—Stephen M. Hepperle
(74) Attorney, Agent, or Firm—Gregory P. Brown

(57) ABSTRACT

A brake fluid pressure relief assembly (50) for a brake system (10) including a pedal assembly (12) employs first and second valves (52, 54) to provide controlled collapse of a brake pedal pad (14) when both a predetermined deceleration limit is exceeded and a predetermined pressure level is exceeded in a hydraulic brake fluid. The first valve (52) is actuated by an inertial mass (84) acting against a first spring (86). With the first valve in the open position, hydraulic fluid passes into a reservoir (68) whose volume is a dependent on the position of the second valve (54). The second valve (54) opens when the fluid pressure in the reservoir exceeds a predetermined pressure limit and compresses a piston (100) against a second spring (114). Accordingly, the forces that can be communicated through the pedal system 10 are reduced during a collision.

20 Claims, 4 Drawing Sheets

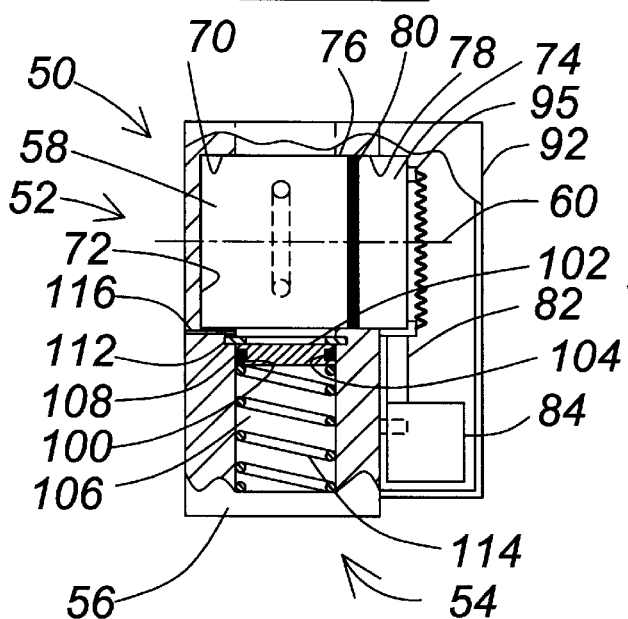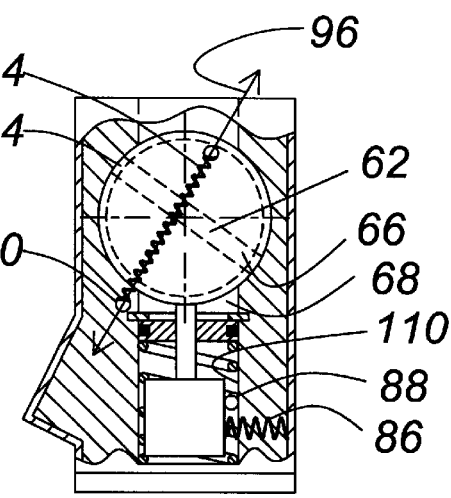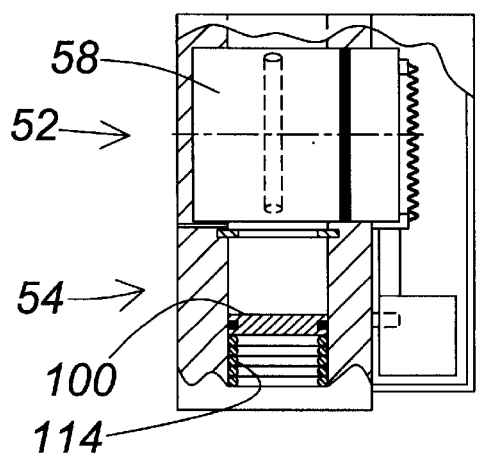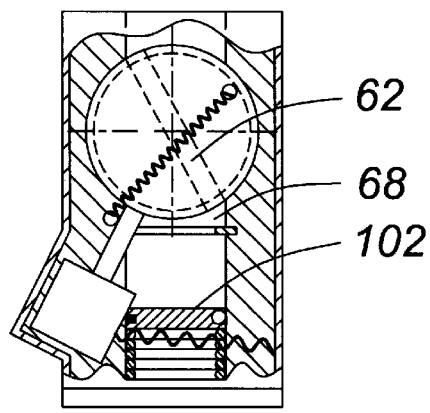

US 6,695,415 B2

BRAKE FLUID PRESSURE RELIEF ASSEMBLY

FIELD OF THE INVENTION

The present invention generally relates to pedal actuated hydraulically devices found in motor vehicles, and more particularly, to a hydraulic brake system, including a a brake pedal assembly, that is collapsible from an operative condition upon imposition of a deceleration to the motor vehicle.

BACKGROUND OF THE INVENTION

It is generally known in the automotive vehicle design arts that it is desirable to configure components arranged within the passenger compartment of the vehicle to reduce adverse effects on the vehicle occupants when during a collision. For instance, many vehicle interior components are designed to absorb energy or minimize forces transferred to occupants during a collision impact, thereby mitigating injuries. Brake pedal assemblies, too, may transfer collision induced forces to a driver's leg. This is because in a severe frontal collision, deformation of the vehicle dash panel can cause the brake pedal assembly to move rearward toward the driver's leg. In addition, the momentum of the driver during the collision can force the driver's leg into the brake pedal assembly.

Conventional vehicle brake pedal assemblies, generally have a foot pedal pad connected to a lever and a piston push rod, which, with assist from a vacuum booster, compresses a master cylinder, which in turn generates hydraulic fluid pressure. One approach to minimizing the energy transferred to a driver's leg through a brake pedal assembly includes causing a failure in the structure supporting at the pivot point of the pedal assembly, thus allowing the pedals to move freely with little constraint following a severe frontal collision. Another approach includes triggering a valve mechanism that opens the hydraulic system, resulting in a substantial reduction of the hydraulic pressure in the system, thereby allowing the pedal to completely collapse. This and other similar approaches significantly increase the cost and complexity of pedal actuated systems. Additionally, they are generally designed to render the brakes inoperative following an initial vehicle collision.

Accordingly, there exists a need, heretofore unfulfilled, for a cost efficient device for use in a vehicle, capable of collapsing a brake pedal assembly to reduce the energy transferred to a driver's leg without compromising the braking capabilities of the vehicle both during and after the initial collision.

SUMMARY OF THE INVENTION

In accordance with the teachings of the present invention, a brake fluid pressure relief apparatus, for use with a brake pedal assembly in a motor vehicle is provided which reduces energy transmitted to a driver's leg from the brake pedal system during a vehicle collision, while retaining the ability to control and maintain vehicle braking. The brake fluid pressure relief apparatus includes a first valve having an inlet in fluid communication with an actuator assembly. The first valve is operated by an inertial mass, allowing passage of hydraulic brake fluid from the inlet through an outlet when the inertial mass reaches a deceleration in excess of a predetermined deceleration limit. The brake fluid pressure relief apparatus further includes a second valve in fluid communication with the outlet of the first valve. This second valve is opens to allow passage of the hydraulic brake fluid into a reservoir when the pressure of the hydraulic brake fluid exceeds a predetermined pressure limit.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings.

FIG. 2 is a front view of a closed pressure relief assembly placed in series with a hydraulic circuit of a hydraulic brake system in accordance with one embodiment of the present invention.

FIG. 3 is a side view of a closed pressure relief assembly placed in series with a hydraulic circuit of a hydraulic brake system in accordance with one embodiment of the present invention.

FIG. 6 is a front view of an open pressure relief assembly placed in series with a hydraulic circuit of a hydraulic brake system in accordance with one embodiment of the present invention.

FIG. 7 is a side view of an open pressure relief assembly placed in series with a hydraulic circuit of a hydraulic brake system in accordance with one embodiment of the present invention.

DETAILED DESCRIPTION OF THE PREFERRED EMBODIMENTS

Figure 1:
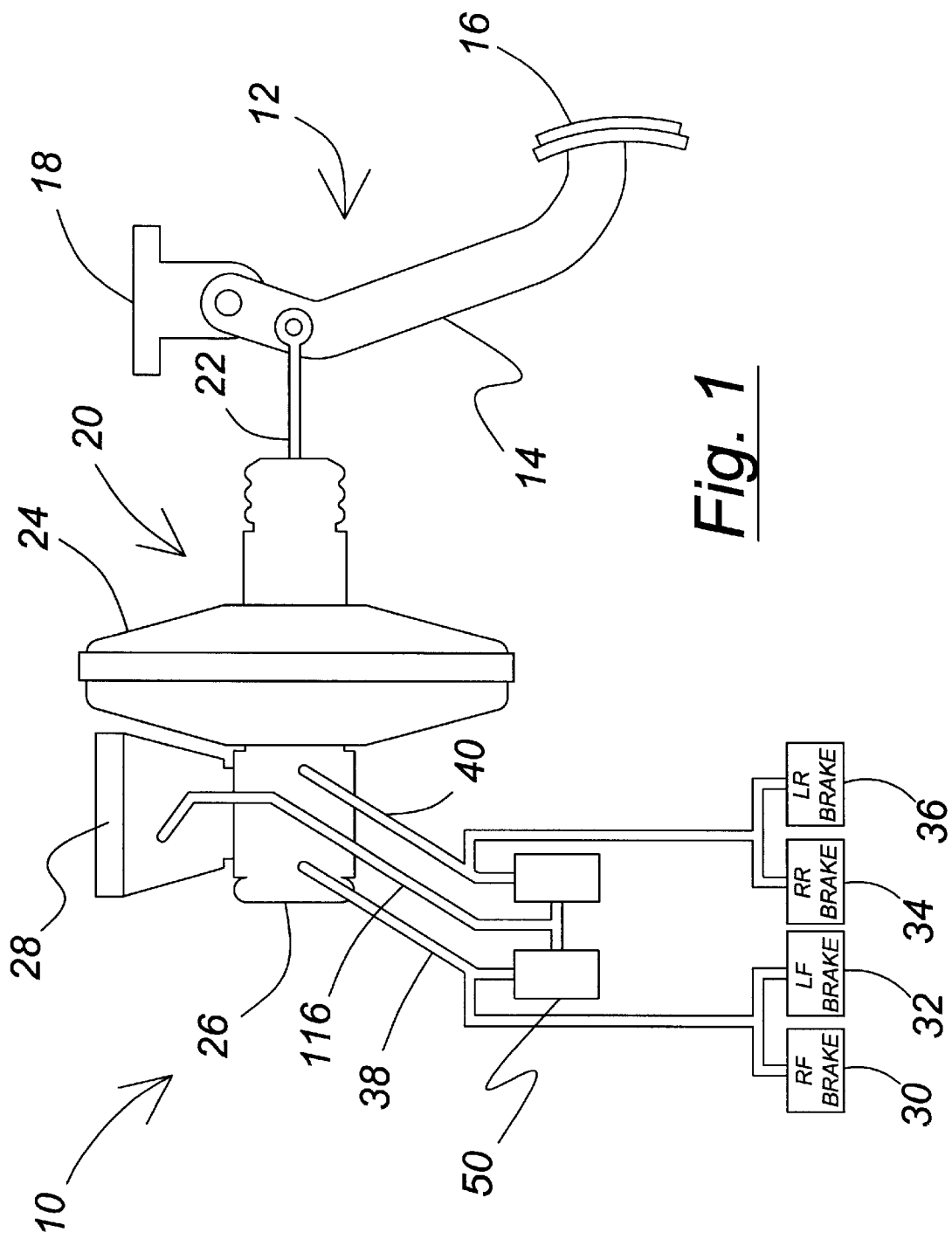
FIG. 1 is a diagrammatic view of a brake pedal system having a pressure relief assembly according to one embodiment of the present invention.

Referring to FIG. 1, a hydraulic brake system 10 is shown according to one embodiment of the present invention for use in braking a vehicle, such as an automobile. The brake system 10 has a brake pedal assembly 12 generally located in the passenger compartment, generally defined rearward of a dash panel in the vehicle. The brake pedal assembly 12 includes an elongated pedal 14 pivotally mounted at its upper end to a pivotal connection 18 which in turn is generally rigidly secured to the dash panel. At the lower end of the pedal 14 is a pedal pad 16 which is configured to be operated by the foot of the vehicle operator, i.e., driver, to pivot the pedal 14 clockwise as shown in FIG. 1 to actuate the braking system. The brake pedal assembly 12 further includes a piston push rod 22 assembled to pedal 14. Push rod 22 is axially movable in cooperation with pedal 14 and operatively engages a brake actuator assembly 20.

The brake actuator assembly 20 is equipped with a vacuum booster 24, a brake master cylinder 26, and a hydraulic fluid storage container 28. Storage container 28 contains a reserve of non-pressurized hydraulic brake fluid.

The vacuum booster 24 provides assist to the piston push rod 22 to actuate the master cylinder 26. The master cylinder 26, in cooperation with the vacuum booster 24, generates a controlled amount of hydraulic fluid pressure in response to axial movement of piston push rod 22, which in turn is responsive to operator actuation of pedal pad 16, as is generally known in the art. The description of the brake actuator assembly 20, made up of vacuum booster 24, master cylinder 26 and container 28, as well as the brake pedal assembly 12, made up of pedal 14, pedal pad 16 and push rod 22, is not intended to be limiting as the present invention encompasses these as well as other conventional brake system assemblies.

The vehicle brake system 10 is shown having four brakes including the right front brake 30, left front brake 32, left rear brake 34, and right rear brake 36, according to one example. Brakes 30–36 provide friction braking to brake the corresponding wheels on the vehicle in response to the hydraulic fluid pressure generated by the actuator assembly 20. Each of brakes 30–36 may include conventional brake assemblies made up of calipers/cylinders and brake pads as is commonly known in the vehicle brake art.

In addition, primary and secondary brake hydraulic circuits 38 and 40 provide hydraulic brake fluid flow paths between the master cylinder 26 and each of brakes 30–36. According to the example shown, hydraulic circuit 38 is coupled to brakes 30 and 32, while hydraulic circuit 40 is coupled to brakes 34 and 36. However, it should be appreciated that one or more hydraulic circuits may employed and may be otherwise connected to one or more brakes. For example, the brake circuits could be diagonally biased, as is commonly known in the vehicle brake art.

According to the present invention, a pressure relief assembly 50 is employed in fluid communication with one or both of the primary and secondary brake hydraulic circuits 38 and 40 and is operative to reduce the brake fluid pressure during a vehicle collision. The pressure relief assembly 50 illustrated actually includes two sets of pressure relief valve assemblies connected in series into both hydraulic circuits 38 and 40. One of those pressure relief valve assemblies will now be described in greater detail.

Referring to FIGS. 2 and 3, the pressure relief assembly 50 includes a valve housing 56 and two valves 52 and 54 placed in series, both of which must be open to cause the pressure in the hydraulic brake fluid to release, which in turn allows the brake pedal 14 to release. The first valve 52 is of the type actuated by an inertial mass. While it could be implemented as a sliding valve, the preferred embodiment contemplates a spool valve.

The first valve 52 includes a rotating cylinder 58 with an axis of rotation 60 and a fluid passage 62 bored through transverse to the axis of rotation and having inlet 64 in fluid communication with the actuator assembly and an outlet 66 at the opposite end for communication with a reservoir 68. The valve housing 56 provides a first bearing surface 70 for receiving a first end 72 of the rotating cylinder. The second end 74 of the rotating cylinder extends through an aperture 76 in the valve housing. A second bearing surface 78 engages the rotating cylinder and a seal 80, such as an o-ring prevents fluid leakage between the rotating cylinder and the aperture 76 in the valve housing. The rotating cylinder can be made from or coated with low-friction poly materials to reduce frictional forces and prevent corrosion.

The rotating cylinder 58 also includes a radially extending lever arm 82 attached to an inertial mass 84. A first spring 86 extends from the valve housing 56 to the inertial mass 84.

The first spring 86 biases the spool valve in a closed position, with the inertial mass resting against a first stop 88. Proper orientation of the pressure relief assembly 50 in the vehicle is accomplished by orienting the axis of rotation 60 parallel to the lateral axis of the vehicle and so that the inertial mass swings toward the front of the vehicle from the closed position under vehicle deceleration. With this orientation established, the first spring 86, the inertial mass 84 and the radially extending lever arm 82 are selected to allow rotation of the fluid passage 62 into an open position upon reaching a vehicle deceleration in excess of a predetermined limit. Further travel of the inertial mass is inhibited by a second stop 90. The first spring 86, the inertial mass 84 and the radially extending lever arm 82 may be protected by a dust cover 92. Alternatively, the spool valve could be constructed entirely within the valve housing, eliminating the need for a seal or a protective dust cover.

One of the advantages of the spool valve over the sliding valve can be illustrated through the selection of the respective inertial masses. In the sliding valve case, the force applied to the first spring is the product of the inertial mass and the acceleration (Ma). In the spool valve a torque rather than a force is applied against the first spring 86 to rotate the fluid passage from the closed position to a closed position. It should be noted that the equivalent rotational force applied at the sliding surface of the rotating cylinder 58 is $$F = Ma \frac{R_M}{R_S}$$

where $R_M$ is the length of the radially extending lever arm 82 on which the inertial mass 84 is attached and $R_S$ is the radius of the rotating cylinder 58 of the first valve. Thus the effective mass of the inertial mass is increased in proportion to the ratio of these two radii, enabling a smaller mass (and correspondingly lighter support structure) than in the sliding valve case.

Figure 4:
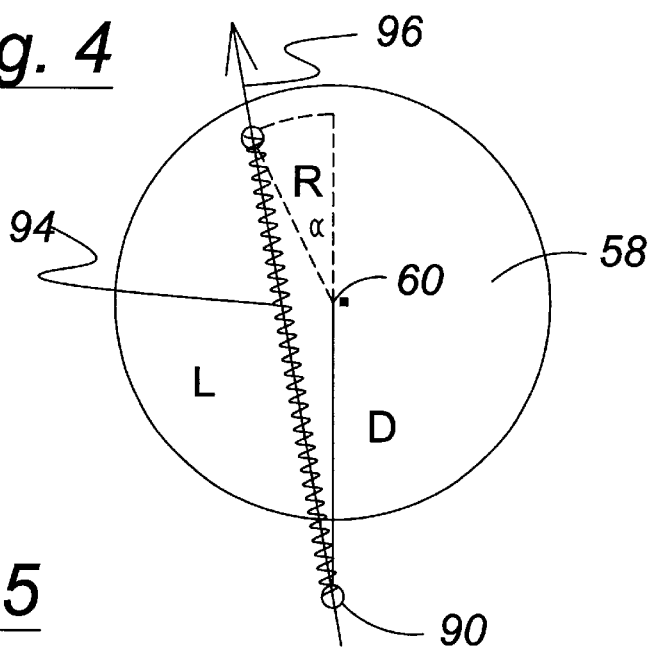
FIG. 4 is a diagrammatic view illustrating one possible geometric relationship of an overcenter spring to a rotating cylinder in accordance with one embodiment of the present invention.

The first valve may also include an overcenter spring 94, extending from the second stop 90 on the valve housing to a predetermined point 95 on the rotating cylinder 58. Referring to FIGS. 2–4, the geometry of the spring is shown in detail. The geometry is selected such that the axis 96 of the overcenter spring 94 crosses over the axis of rotation 60 of the rotating cylinder 58 part way through the rotation between the closed position and the open position. The torque produced by the overcenter spring 94 at first opposes the rotation of the valve and then as the spring crosses the axis of rotation, assists it. The torque exerted by the spring is:

$$\tau(\alpha) = kDR\left(1 - \frac{L_0}{L}\right)\sin(\alpha)$$

where k is the spring constant, D is the distance from the axis of rotation 60 of the rotating cylinder 58 to the second stop 90, R is the radius of the point of attachment of the overcenter spring 94 to the rotating cylinder 58, $L(\alpha)$ is the length of the overcenter spring 94 which varies with the angle $\alpha$, as illustrated in FIG. 4, and $L_0$ is the unstretched length of the overcenter spring 94. The dependence of the stretched length L on a is given by $$L(\alpha) = [R^2 + D^2 + 2RD\cos(\alpha)]^{\frac{1}{2}}$$

Figure 5:
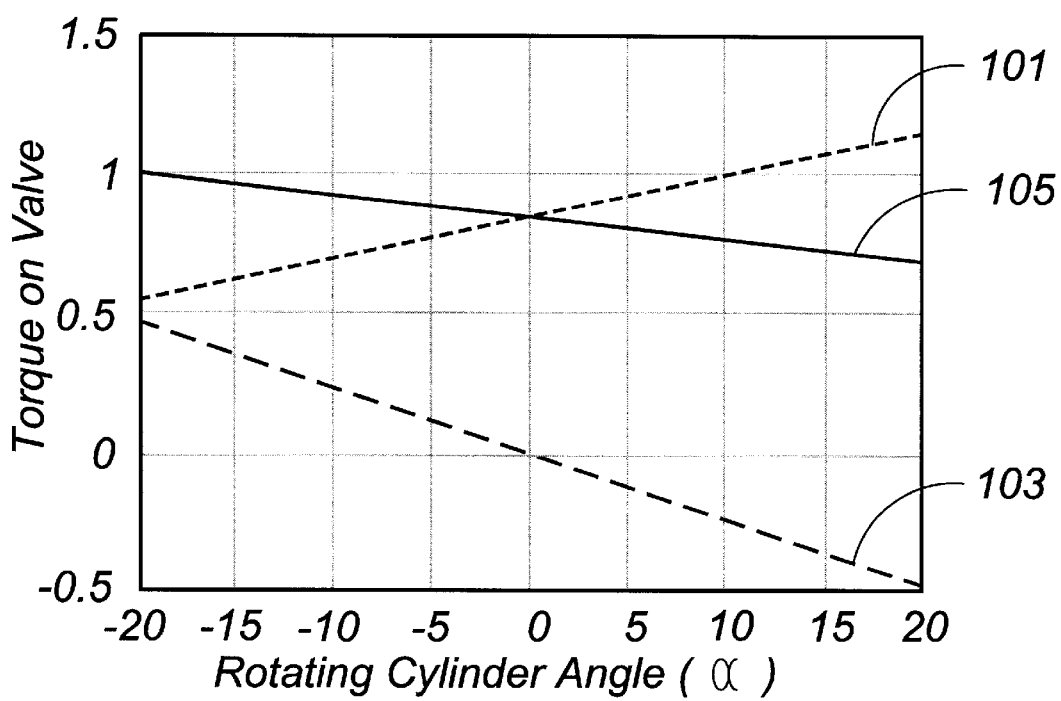
FIG. 5 is a graphical illustration of the torques imposed on a rotation cylinder by an overcenter spring and a first spring in accordance with one embodiment of the present invention.

Referring to FIG. 5 for an example, the torque created by the overcenter spring in a situation in which D=1.2 R and $L_0$=D.

The torque scale is shown in arbitrary units, as the actual torque produced depends upon the spring constant chosen. The torque on the rotating cylinder created by the overcenter spring 94 is shown as the dashed line 101. The torque on the rotating cylinder created by first spring 86 is shown as the dotted line 103, again in arbitrary units. Due to the two springs acting in parallel, the net torque on the rotating cylinder is the sum of the two torques, shown as the solid line 105. In the absence of deceleration, the rotating cylinder remains in the closed position ($\alpha=-20°$), held by the 1-unit torque produced by the two springs. When the deceleration is such that the opposing torque on the rotating cylinder 58 produced by the inertial mass exceeds this value, the valve begins to open. As it does, the net spring torque drops below 1 unit, so that the 1-unit torque on the rotating cylinder immediately opens the valve fully ($\alpha=+20°$). Thus the valve is bistable—there is no intermediate position where the fluid passage is partially open.

A further advantage comes from the ability to have the fluid passage remain in the open position until the deceleration acting on the inertial mass drops below a second predetermined limit equal to or lower than the first predetermined limit, at which point the valve immediately rotates to the closed position. In the present example, when there is less than 0.7-unit torque acting on the rotating cylinder, the valve immediately closes fully ($\alpha=-20°$). This prevents the possibility of the valve oscillating as the deceleration varies around equal first and second predetermined limits. This second predetermined limit may be chosen independent of the first by adjusting the parameters of the first and overcenter springs.

Referring back to FIGS. 2 and 3, the second valve 54 is located adjacent to the reservoir 68 at the outlet 66 of the first valve 52. The second valve includes a piston 100 having a first side 102 adjacent to the reservoir and a second side 104 facing into a blind bore 106. A seal 108 placed around the circumference of the piston 100 seals against a wall 110 of the blind bore. The piston 100 is normally held in an extended position against a circlip stop 112 by a second spring 114. Alternatively, the circlip stop could be eliminated, simply allowing the piston to be stopped in the extended position by the rotating cylinder. The piston diameter and second spring parameters are selected such that with the first valve opened by deceleration and upon the hydraulic fluid exceeding a predetermined pressure limit, the piston compresses the second spring to a fully compressed position, creating maximum, predetermined reservoir volume from the blind bore 106.

A return passage 116 provides for fluid return from the reservoir 68 to the storage container 28. The return passage 116 should be significantly constricted such that negligible fluid can be transferred over a period of a few seconds during actuation of the pressure relief assembly 50. However, over time, the force of the second spring acting to return the piston to the extended position displaces the fluid from the reservoir 68 into the storage reservoir 28, and the system returns to a fully-functional state. Alternatively, the return passage could be eliminated provided appropriate leakage between the rotating cylinder and the valve housing and the ability of the piston to return to the extended position.

Figure 8:
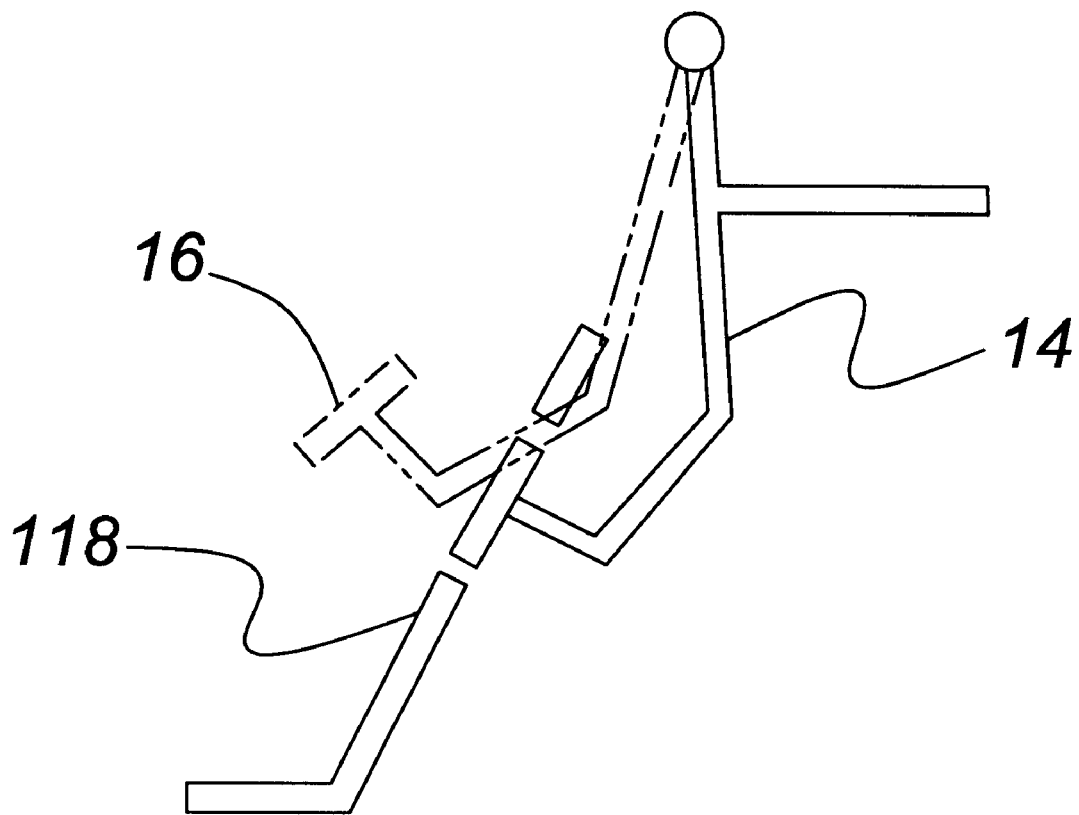
FIG. 8 is a side view illustrating the motion of a brake pedal in accordance with one embodiment of the present invention.

Referring now to FIGS. 6 and 7, in a crash resulting in sufficient deceleration, the rotating cylinder 58 of the first valve 52 rotates to the open position allowing hydraulic brake fluid under pressure from the master cylinder to flow through the fluid passage 62 and contact first side 102 of the piston 100 of the second valve 54. If the pressure is sufficiently high (i.e., the driver is pressing hard on the brake) the force on the piston 100 overcomes the spring force created by the second spring 114, pushing the piston downward, allowing hydraulic brake fluid to accumulate in reservoir 68. Allowing, in turn, the brake pedal 14 to collapse, as shown in FIG. 8.

The reservoir 68 can be sized such that when the pressure of the hydraulic fluid exceeds a predetermined limit, and the piston ceases travel at the compressed position, resulting in the reservoir taking on a predetermined volume of pressurized hydraulic fluid, which in turn limits further collapse of the brake pedal 14. As shown in FIG. 8, when the reservoir sized as such, the pedal pad 16 collapses almost, but not quite, to a floor panel 118. In addition to relieving the force in the pedal assembly, this provides the additional benefit of allowing the driver's foot to be supported by the floor panel 118, mitigating incremental injury that might otherwise occur to the foot, while still allowing the pedal pad 16 to activate the brakes. To further aid in this, the floor panel or foot support 118 may be made of a somewhat flexible or compressible material sufficiently rigid to support the driver's foot, but which can bend or deform enough to allow the driver to continue to put pressure on the pedal pad 16, thus providing some continued degree of braking, without requiring a brake pedal pumping action by the operator.

In this regard, it should be appreciated that pressure relief assembly 50 continuously allows hydraulic brake fluid flow between the master cylinder 26 and each of brakes 30–36, and preferably is operable only to divert up to a predetermined volume of brake fluid to allow the brake pedal to collapse during a vehicle collision. Throughout the event, vehicle braking is maintained.

Accordingly, the present invention allows the brake pedal assembly to be at least partially released upon imposition of both a minimum deceleration and minimum braking force applied by the operator. While the present invention has been described herein in connection with reducing injuries resulting from braking during a vehicle collision, it should be appreciated that the present invention may be used with other types of hydraulically controlled, pedal actuated assemblies to minimize adverse affects on the vehicle occupants. For example, the present invention may be used in conjunction with a hydraulic clutch assembly pedal.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A brake fluid pressure relief apparatus for an automotive vehicle, said apparatus comprising:
   a first valve having an inlet in fluid communication with an actuator assembly, said first valve having an inertial mass operative to allow passage of hydraulic brake fluid through an outlet of said first valve upon said inertial mass attaining a deceleration in excess of a predetermined deceleration limit; and
   a second valve in fluid communication with said outlet of said first valve, said second valve being operative to allow passage of said hydraulic brake fluid into a reservoir in response to said hydraulic brake fluid exceeding a predetermined pressure limit.

2. The apparatus as defined in claim 1 further comprises a return passage disposed between said reservoir and said actuator assembly allowing fluid communication from said reservoir to said actuator assembly.

3. The apparatus as defined in claim 1, wherein said first valve further comprises a first spring disposed between said intertial mass and a valve housing, said first spring being biased to maintain said first valve in a closed position.

4. The apparatus as defined in claim 1, wherein said first valve further comprises a cylinder rotatably disposed within a valve housing and having a radially extending lever arm connected to said inertial mass, said cylinder having a fluid passage therethrough for communicating hydraulic brake fluid from said inlet to said outlet when said cylinder is rotated from a closed position to an open position.

5. The apparatus as defined in claim 4, wherein said first valve further comprises an overcenter spring disposed between said valve housing and said cylinder such that an axis of said overcenter spring passes over a rotational center of said cylinder as said cylinder is rotated between said closed position and said open position.

6. The apparatus as defined in claim 1, wherein said second valve further comprises a piston slidably disposed within a blind bore and having said hydraulic fluid acting on a first side of said piston and a second spring acting on a second side of said piston, said second spring biasing said piston to an extended position, said piston being operative to compress said second spring upon said hydraulic fluid exceeding said predetermined pressure limit, said piston thereby passing into said blind bore and allowing an increase of passage of said hydraulic brake fluid into said reservoir.

7. The apparatus as defined in claim 1, wherein said second valve further comprises a seal disposed between said piston and a wall of said blind bore to prevent fluid leakage from said first side of said piston to said second side of said piston.

8. The apparatus as defined in claim 6, wherein said piston ceases compressing said second spring at a compressed position corresponding to a predetermined reservoir volume.

9. The apparatus as defined in claim 6, wherein said piston ceases compressing said second spring at a compressed position, thereby limiting said reservoir to a predetermined volume corresponding to said fully collapsed position of said pedal pad.

10. A brake fluid pressure relief apparatus for an automotive vehicle, said apparatus comprising:

a first valve having an inlet in fluid communication with an actuator assembly, said first valve having an inertial mass operative to allow passage of hydraulic brake fluid through an outlet of said first valve upon said inertial mass attaining a deceleration in excess of a predetermined deceleration limit; and a second valve in fluid communication with said outlet of said first valve, said second valve being operative to allow passage of said hydraulic brake fluid into a reservoir in response to said hydraulic brake fluid exceeding a predetermined pressure limit; and a return passage disposed between said reservoir and said actuator assembly allowing fluid communication from said reservoir to said actuator assembly.

11. The apparatus as defined in claim 10 further comprises a return passage disposed between said reservoir and said actuator assembly allowing fluid communication from said reservoir to said actuator assembly.

12. The apparatus as defined in claim 10, wherein said first valve further comprises a first spring disposed between said intertial mass and a valve housing, said first spring being biased to maintain said first valve in a closed position.

13. The apparatus as defined in claim 10, wherein said first valve further comprises a cylinder rotatably disposed within a valve housing and having a radially extending lever arm connected to said inertial mass, said cylinder having a fluid passage therethrough for communicating hydraulic brake fluid from said inlet to said outlet when said cylinder is rotated from a closed position to an open position.

14. The apparatus as defined in claim 13, wherein said first valve further comprises an overcenter spring disposed between said valve housing and said cylinder such that an axis of said overcenter spring passes over a rotational center of said cylinder as said cylinder is rotated between said closed position and said open position.

15. The apparatus as defined in claim 10, wherein said second valve further comprises a piston slidably disposed within a blind bore and having said hydraulic fluid acting on a first side of said piston and a second spring acting on a second side of said piston, said second spring biasing said piston to an extended position, said piston being operative to compress said second spring upon said hydraulic fluid exceeding said predetermined pressure limit, said piston thereby passing into said blind bore and allowing an increase of passage of said hydraulic brake fluid into said reservoir.

16. The apparatus as defined in claim 10, wherein said second valve further comprises a seal disposed between said piston and a wall of said blind bore to prevent fluid leakage from said first side of said piston to said second side of said piston.

17. The apparatus as defined in claim 15, wherein said piston ceases compressing said second spring at a compressed position corresponding to a predetermined reservoir volume.

18. A releasable brake pedal apparatus for an automotive vehicle, said apparatus comprising:

a pedal assembly including a pedal pad operatively engageable by a vehicle operator;

an actuator assembly for pressurizing a hydraulic brake fluid in response to actuation of said pedal assembly;

a first valve having an inlet in fluid communication with said actuator assembly, said first valve having an inertial mass operative to open said first valve and allow passage of hydraulic brake fluid through an outlet of said first valve upon said inertial mass attaining a deceleration in excess of a predetermined deceleration limit; and a second valve in fluid communication with said outlet of said first valve, said second valve being operative to allow passage of said hydraulic brake fluid into a reservoir in response to said hydraulic brake fluid exceeding a predetermined pressure limit, whereby said pedal pad of said pedal assembly travels to a fully collapsed position.

19. The apparatus as defined in claim 16, wherein said first valve further comprises a cylinder rotatably disposed within a valve housing and having a radially extending lever arm connected to said inertial mass, said cylinder having a fluid passage therethrough for communicating hydraulic brake fluid from said inlet to said outlet when said cylinder is rotated from a closed position to an open position.

20. The apparatus as defined in claim 18, wherein said second valve further comprises a piston slidably disposed within a blind bore and having said hydraulic fluid acting on a first side of said piston and a second spring acting on a second side of said piston, said second spring biasing said piston to an extended position, said piston being operative to compress said second spring upon said hydraulic fluid exceeding said predetermined pressure limit, said piston thereby passing into said blind bore and allowing an increase of passage of said hydraulic brake fluid into said reservoir.

* * * * *